Aug. 18, 1959     F. A. KEIDEL     2,900,317
COULOMETRIC REAGENT GENERATION
Filed May 3, 1955
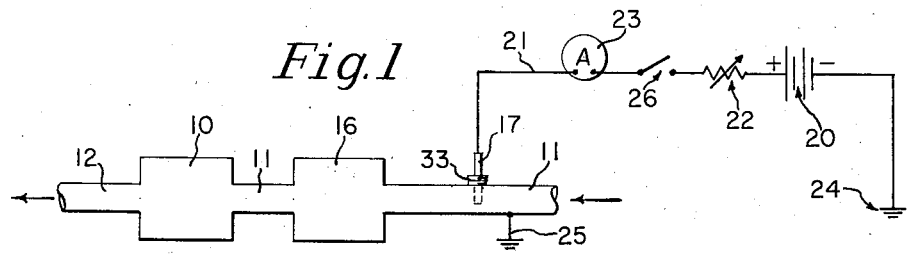
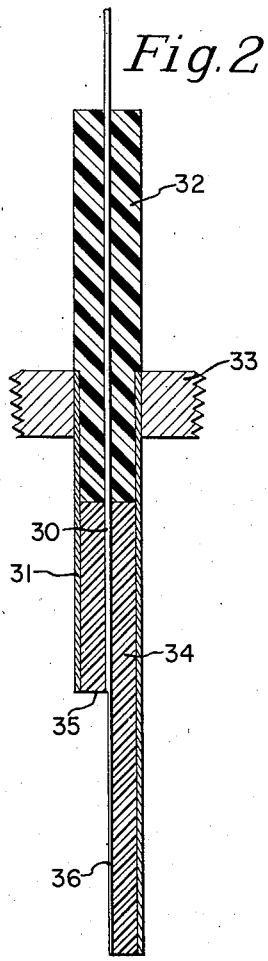
INVENTOR
FREDERICK A. KEIDEL
BY *Harry J. McCauley*
ATTORNEY United States Patent Office 2,900,317
Patented Aug. 18, 1959

2,900,317

COULOMETRIC REAGENT GENERATION

Frederick A. Keidel, Wilmington, Del., assignor to E. I. du Pont de Nemours and Company, Wilmington, Del., a corporation of Delaware Application May 3, 1955, Serial No. 505,597

2 Claims. (Cl. 204—195)

This invention relates to a coulometric method and apparatus for the generation of a definite amount of a gaseous reagent, and particularly to a method and apparatus for the generation of precise amounts of gaseous reagents useful for the calibration of chemical analyzers.

In recent years the chemical industry has equipped many operations with continuous or near-continuous automatic analyzers for the control of composition and of process operations in reactant or product streams. These instruments change in their calibrations over a period of time and it is necessary to check the calibrations occasionally to determine if adjustments or reconditioning is necessary to preserve reliability as regards accuracy. A check of analyzer calibration can be accomplished conveniently by introducing a known quantity of a material which the analyzer is capable of measuring in the gas stream and, knowing the rate of flow of the gas supplied to the analyzer, determining the reading of the analyzer as the check reagent is fed to it compared with the known quantity of the reagent added to the stream. It is desirable to conduct the calibration without taking the analyzer out of service and it is preferred, in the interest of precision, to utilize only very small quantities of reagents for the purpose. The supply and introduction of very precise amounts of gaseous reagents to analyzer supply lines is very difficult, since very accurate metering devices are required and standard gas mixtures usually cannot be stored in any reservoirs without a change in composition which, of course, cannot be tolerated.

An object of this invention is to provide a very precise method and apparatus for the generation within a gas stream of a gaseous reagent. Another object of this invention to to provide a method and apparatus for the generation of a gaseous reagent in a gas stream which has a high speed of response and is simple and economical as regards the equipment and operation. Another object of this invention is to provide a method and apparatus for the generation of a gaseous reagent in a gas stream which requires no storage facilities for the reagent and which is essentially of the dry type. The manner in which these and other objects of this invention are obtained will become apparent from the detailed description and the following drawings, in which:

Fig. 1 is a schematic representation of a piping circuit including a conventional gas analyzer and provided with one embodiment of gaseous reagent generator according to this invention, and Fig. 2 is a longitudinal sectional view of the electrode assembly of the reagent generator of Fig. 1.

In general, this invention comprises a method and apparatus for generating in a gas stream a reagent consisting of one of the group comprising oxygen, hydrogen and a gaseous element having an overvoltage below oxygen or hydrogen which is a constituent of a water-soluble compound present in the gas stream comprising passing wet gas, together with the water-soluble compound where the reagent desired is other than oxygen or hydrogen, at a predetermined rate of flow into contact with a hygroscopic substance electrically conductive only when wet, absorbing in the hygroscopic substance some of the water from the gas together with a quantity of any of the water-soluble compound present in the gas, conducting an electrolysis of the material absorbed in the hygroscopic substance to generate the gaseous reagent and deliver it to the gas stream, and determining the amount of the gaseous reagent delivered to the gas stream as a function of the electric current used in the electrolysis.

This invention is particularly adapted to supplying coulometric reagents in the class including oxygen, hydrogen and the halogens, although it can be utilized for the supply of other gaseous elements having an overvoltage below that of oxygen or hydrogen. As a practical matter, most analyzers in the systems in which they are installed can be checked for calibration by either direct or indirect techniques known to persons skilled in the art with oxygen or hydrogen, thereby obviating the employment of other substances which, because of their inherent reactivity, are less preferred.

Referring to Fig. 1, a typical analyzer circuit might include the analyzer 10 which is continuously supplied with a gaseous sample stream through line 11 and which discharges the sample to line 12, which may restore the material in flow to the process piping or discharge it to waste. Line 11 preferably has interposed in it gas meter 16 measuring the rate of gas flow to analyzer 10.

The apparatus of this invention comprises the electrode assembly indicated generally at 17 which is supplied with electric current from a suitable D.C. source, such as battery 20, the positive terminal of which is connected to lead 21 running to the anode of the assembly. Interposed in series between battery 20 and the anode is variable resistor 22, for regulating the voltage across the electrode pair within desired limits, control switch 26 and ammeter 23. The circuit is completed by ground 24 connected to the negative terminal of battery 20, line 11 being similarly grounded at 25.

As shown in Fig. 2, a preferred embodiment of the reagent generator according to this invention may comprise the electrode assembly consisting of central wire anode 30, the lower end of which is provided with cylindrical cathode 31 disposed concentric therewith. The upper end of anode 30 is insulated from contact with the cathode and any neighboring metal objects by plastic plug 32, which may be polytetrafluorethylene, or the like. The assembly is preferably provided with a screw plug 33, integral with cathode 31, adapted to be screwed into a tapped hole in line 11, thereby sealing the connection of the electrode assembly in gas-tight relationship with respect to the gas supply line.

Interposed between anode 30 and cathode 31 is a unitary, substantially water impervious mass of electrically insulative filling 34 which may conveniently consist of a commercially available epoxy casting resin. The reagent generating capacity of the electrode assembly is proportional to the exposed areas of the electrodes and the hygroscopic substance with which the filling 34 is coated. Accordingly, it is desirable to cut away radially along line 35 approximately one-half of the cathode, filling and anode to expose a substantial surface of the components of the assembly to contact with the gas stream. Preferably, the assembly is disposed in pipe 11 with the cut-away surface 36 disposed parallel to the line of gas flow.

As hereinabove mentioned, the surface 36 is coated with a hygroscopic substance, bridging across anode 30 and cathode 31, which is capable of absorbing water together with any water-soluble compounds in the gas which contain the desired reagent as a constituent and which hygroscopic substance, at the same time, is not in itself affected by the electrolysis. Numerous electrically conductive materials are available for use as hygroscopic materials in conjunction with this invention; however, phosphoric acid has proved to be completely satisfactory where an acid material is desired and potassium hydroxide or sodium hydroxide have proved equally useful where basic properties in the absorbent are necessary. Where phosphoric acid is utilized it is preferred to apply the acid as a dilute solution of the order of about 10% acid content, since the acid is then of a viscosity permitting ready application. It is then possible to dehydrate the acid by conducting the electrolysis for a sufficient time to electrolyze the absorbed water completely as described in my copending applications S.N. 505,598, now Patent No. 2,816,067, and S.N. 505,599, now Patent No. 2,830,945, of the same filing date. I have found that electrolysis of a 10% phosphoric acid solution, using a 45 v. "B" battery as the power source, requires about 30 hours for complete dehydration; however, since the objective of this invention is to provide predetermined quantities of gaseous reagents, it will be understood that it is not necessary to dehydrate the hygroscopic substance and, normally, operation will never be carried to the point of dehydration. It should be mentioned that, even if electrolysis is carried to complete dehydration, the hygroscopic substance will suffer no damage whatever and current flow through it will, in fact, cease due to an abrupt rise of the resistance when the water content decreases to near zero levels.

In operation, it will be understood that the presence of a certain amount of water in the gas stream is essential to operation regardless of whether the gaseous reagent to be generated is oxygen, hydrogen or some other element not a constituent of water. Furthermore, it is a condition of successful operation that the concomitant presence of hydrogen with oxygen will not affect analyzer indication when oxygen is the reagent against which calibration is to be conducted, or conversely, oxygen should not be an interferant where hydrogen is the calibration reagent. In the case where calibration is to be accomplished by the utilization of an element having a lower overvoltage than either oxygen or hydrogen, I have found that no oxygen or hydrogen will be generated during the electrolysis so long as a substantial quantity of the compound of which the elemental reagent is a component is dissolved in the absorbed water. Thus, where chlorine is the reagent to be generated, if a relatively small amount of hydrogen chloride of the order of 1.0% is added to the gas stream and proper voltage control is preserved, chlorine will be liberated coulometrically at the anode without any generation of oxygen or hydrogen. Consequently, the electric current consumed is a direct measure of reagent generated in accordance with Faraday's law.

Where oxygen or hydrogen is the reagent desired, most process gas streams ordinarily contain enough water vapor to provide the absorbate for the hygroscopic substance. If the invention is to be utilized with an extremely dry gas stream, water can be readily supplied to filling 34 through the agency of a wick structure supplied with water from an outside reservoir in an obvious manner. In actual service, a current expenditure of 26 microamperes are required for each p.p.m. of oxygen added to a gas stream of 100 cc./minute.

From the foregoing it will be understood that this invention may be modified extensively without departure from its essential spirit and it is therefore intended to be limited only by the following claims.

What is claimed is:

1. A coulometric gaseous reagent generating apparatus comprising in combination an exposed wire electrode, a tubular electrode having an inside diameter substantially greater than the outside diameter of said wire electrode disposed in concentric relationship with respect to said wire electrode, a self-supporting unitary non-porous electrically insulative filling disposed between said wire electrode and the inside of said tubular electrode with surface exposed adjacent exposed surfaces of said wire and tubular electrodes, a hygroscopic substance which is electrically conductive only when wet coated on said exposed surfaces and bridging the span between said electrodes, a direct current power source of voltage sufficient to electrolyze water and dissolved materials absorbed in said hygroscopic substance connected across said electrodes, and current measuring means connected in circuit with said power source and said electrodes for measuring quantitatively said gaseous reagent generated as a function of the current delivered by said power source in the course of electrolysis of the absorbate in said hygroscopic substance.

2. A coulometric reagent generating apparatus according to claim 1 wherein said tubular electrode and said filling are cut away to expose substantial areas of said filling and said wire electrode.

References Cited in the file of this patent

UNITED STATES PATENTS

| | | |
|---|---|---|
| 1,333,838 | Csanyi | Mar. 16, 1920 |
| 1,913,702 | D'Adrian | June 13, 1933 |
| 1,919,858 | Pettingill | July 25, 1933 |
| 2,681,571 | Becker | June 22, 1954 |
| 2,805,191 | Hersch | Sept. 3, 1957 |
| 2,816,067 | Keidel | Dec. 10, 1957 |
| 2,830,945 | Keidel | Apr. 15, 1958 |

FOREIGN PATENTS

France _____ June 11, 1940
(Addition to No. 50,505)